（12）United States Patent
Mamtimin et al.

(10) Patent No.: US 12,474,500 B2
(45) Date of Patent: Nov. 18, 2025

(54) PULSED NEUTRON LOGGING MINERALOGY USING OXIDE STANDARDS

(71) Applicant: Halliburton Energy Services, Inc., Houston, TX (US)

(72) Inventors: Mayir Mamtimin, Houston, TX (US); Jeffrey James Crawford, Houston, TX (US); Weijun Guo, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 223 days.

(21) Appl. No.: 18/218,822

(22) Filed: Jul. 6, 2023

(65) Prior Publication Data

US 2024/0361486 A1    Oct. 31, 2024

Related U.S. Application Data

(60) Provisional application No. 63/462,400, filed on Apr. 27, 2023.

(51) Int. Cl.
*G01V 5/10* (2006.01)
*G01V 5/04* (2006.01)

(52) U.S. Cl.
CPC .............. *G01V 5/102* (2013.01); *G01V 5/045* (2013.01)

(58) Field of Classification Search
CPC .................. G01V 5/102; G01V 5/045
See application file for complete search history.

(56) References Cited

U.S. PATENT DOCUMENTS

| | | | |
|---|---|---|---|
| 5,369,578 A | 11/1994 | Roscoe et al. | |
| 5,440,118 A * | 8/1995 | Roscoe ................. | G01V 5/101 |
| | | | 250/269.6 |
| 8,510,050 B2 | 8/2013 | Truax et al. | |
| 9,823,384 B1 | 11/2017 | Wang et al. | |
| 9,835,757 B2 | 12/2017 | Guo et al. | |
| 11,340,378 B2 * | 5/2022 | Galford ................. | E21B 7/04 |
| 11,681,069 B1 | 6/2023 | Mamtimin et al. | |
| 11,681,070 B2 | 6/2023 | Mamtimin et al. | |
| 2014/0197324 A1 | 7/2014 | Mendez et al. | |
| 2018/0113233 A1 | 4/2018 | Vinokurov et al. | |
| 2019/0025198 A1 | 1/2019 | Washburn | |
| 2022/0171086 A1 | 6/2022 | Mamtimin et al. | |

FOREIGN PATENT DOCUMENTS

CA    3102931 A1 *  12/2019  ............. G01V 5/101

OTHER PUBLICATIONS

International Search Report and Written Opinion for International Patent Application No. PCT/US2023/028531 dated Jan. 24, 2024. PDF file. 7 pages.

* cited by examiner

*Primary Examiner* — David P Porta
*Assistant Examiner* — Fani Polyzos Boosalis
(74) *Attorney, Agent, or Firm* — John W. Wustenberg; C. Tumey Law Group, PLLC

(57) ABSTRACT

The techniques as described herein enhance the accuracy and precision of mineralogy analysis in elemental spectroscopy logging by utilizing oxide standards and/or rock-forming mineral compounds as reference materials that provide more representative and realistic signatures of geological formations. A method comprises logging a wellbore with a tool and fitting reference spectra from oxide compounds and/or rock-forming mineral compounds against measured gamma spectra obtained with the tool, to characterize a subterranean formation that the wellbore extends through.

18 Claims, 2 Drawing Sheets

PULSED NEUTRON LOGGING MINERALOGY USING OXIDE STANDARDS

CROSS-REFERENCE TO RELATED APPLICATIONS

The present application claims priority to U.S. Provisional Application No. 63/462,400, filed Apr. 27, 2023, the entire disclosure of which is incorporated herein by reference.

BACKGROUND

During oil and gas exploration, many types of information may be collected and analyzed. The information may be used to determine the quantity and quality of hydrocarbons in a reservoir and to develop or modify strategies for hydrocarbon production. For instance, the information may be used for reservoir evaluation, flow assurance, reservoir stimulation, facility optimization, production enhancement strategies, and reserve estimation. Petrophysical properties of a formation may be utilized as additional information that may further drive strategies for hydrocarbon production. Petrophysical properties may comprise borehole size and casing size, tool position and standoff, borehole fluid content, casing and cement quality, formation lithology, formation porosity, formation oil saturation, and/or holdup.

Generally, a pulsed neutron logging (PNL) tool is used to determine petrophysical properties of a formation. A pulsed neutron logging tool emits neutrons to interact with nuclei of any material to induce gamma radiation. The excited target nucleus relaxes to its ground state by emitting characteristic gamma radiation. Some elements emit gamma rays naturally; others can be bombarded with neutrons to induce gamma ray emissions. Each element produces characteristic gamma rays of specific energies. Further, the number of characteristic gamma rays produced is proportional to the abundance of the element. Naturally occurring and induced gamma rays may be counted and sorted according to energy. This produces a gamma ray spectrum that can be processed, or decoded, to identify the elements and their concentrations.

A pulsed-neutron logging tool may operate and function by utilizing nuclear detectors to measure induced gamma radiation by interaction of high energy neutrons that are emitted from a generator. The high energy neutrons interact with the formation in three ways: elastic neutron-scattering, inelastic neutron scattering, and neutron absorption. In elastic neutron-scattering, the neutron bounces off the bombarded nucleus without exciting it or destabilizing it. With each elastic interaction, the neutron loses energy. Hydrogen, with the mass of its nucleus equal to that of a neutron, is very good at slowing down neutrons. Hence, how efficiently a formation slows down neutrons generally indicates the abundance of hydrogen. Because hydrogen is most abundant in pore fluids, neutron slowdown indicates porosity. In inelastic neutron scattering, the neutron bounces off the nucleus, but excites it into quickly giving off what are called inelastic gamma rays. The measurement of gamma ray energies from inelastic neutron scattering yields the relative concentrations of carbon and oxygen, which are then used to determine water saturation. In neutron absorption, the nucleus absorbs the neutron and becomes excited, typically emitting captured gamma rays. Neutron absorption, or neutron capture, is most common after a neutron has been slowed by elastic and inelastic interactions to thermal energies of about 0.025 eV. The measurement of capture gamma ray energies is used to estimate the abundances of elements most likely to capture a neutron-silicon, calcium, chlorine, hydrogen, sulfur, iron, titanium, and gadolinium.

However, it may be a challenge to obtain accurate concentrations of the major elements in the formation due to the complexity of lithology, the current calibration of the pulsed-neutron logging tool, and the resulting limitations of the data processing method. For instance, in a weighted-least-square fitting algorithm, reference spectra of pure elements are employed as constituents for fitting. The algorithm determines the relative elemental yields by iteratively adjusting the coefficients of the reference spectra to minimize the difference between the measured gamma spectra and the fitted spectra. These relative elemental yields are then converted to absolute elemental yields using calibration factors obtained from standards. Although pure elements are the fundamental constituents of a formation matrix, it is an unnatural representation of a chemical composition and complex mixture of the formation matrix, leading to less accurate quantification of elemental concentrations and mineralogy distribution.

BRIEF DESCRIPTION OF THE DRAWINGS

These drawings illustrate certain aspects of some examples of the present disclosure and should not be used to limit or define the disclosure.

DETAILED DESCRIPTION

The present disclosure relates to systems and methods that enhance the accuracy and precision of mineralogy analysis in pulsed-neutron logging spectroscopy by utilizing oxide standards as reference materials. Oxide standards provide more representative and realistic signatures of geological formations than pure elemental standards. Therefore, the pulsed-neutron logging tool is better calibrated, and the weighted-least-square fitting algorithm leads to a better mineralogy and lithology evaluation.

Figure 1:
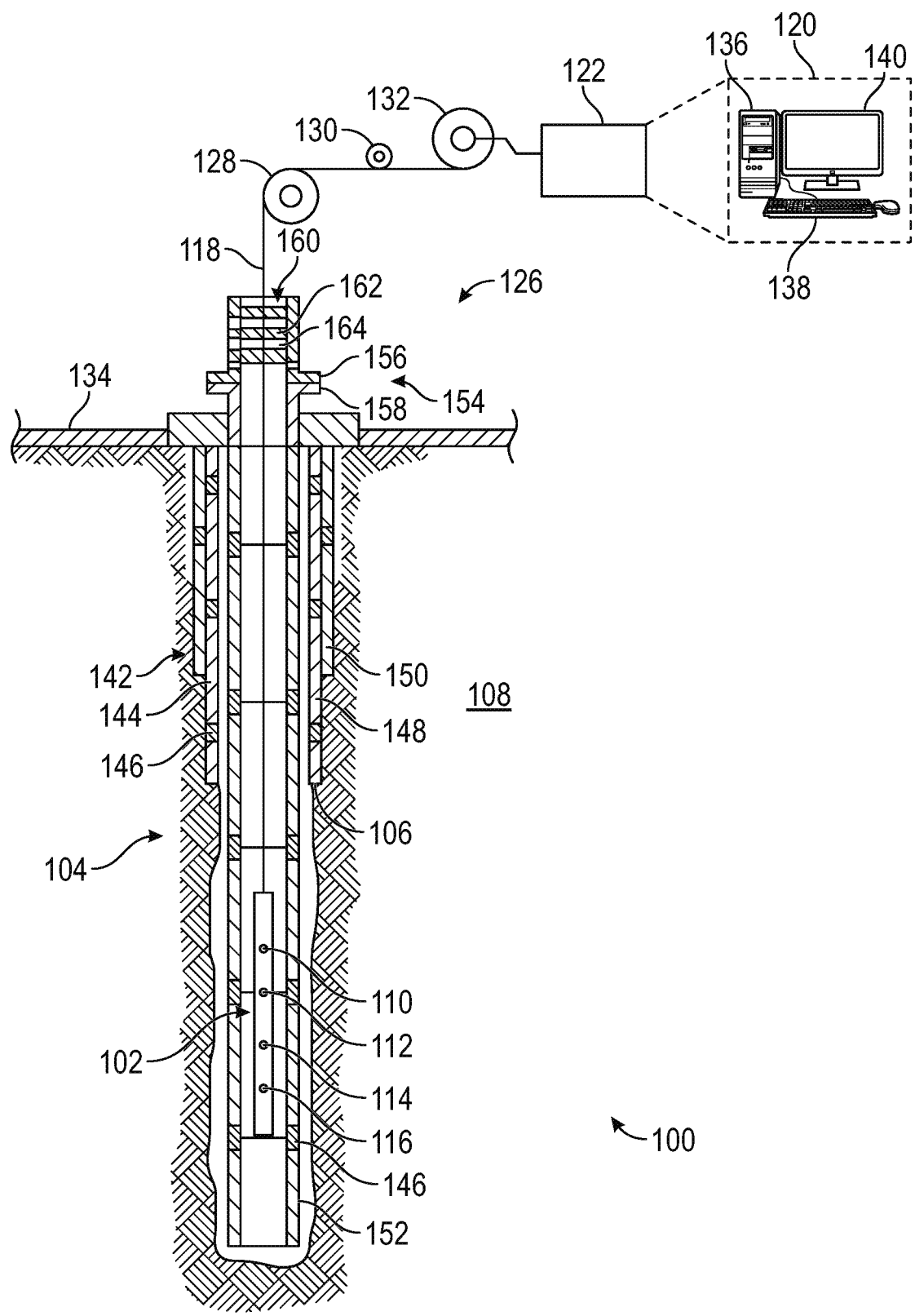
FIG. 1 illustrates a downhole tool disposed in a subterranean formation, in accordance with examples of the present disclosure.

Pulsed-neutron logging is a widely used technique in oil and gas wells for evaluating formation oil saturation. FIG. 1 illustrates logging/measuring operation 100, as disclosed herein, utilizing a pulsed-neutron logging (PNL) tool 102. FIG. 1 illustrates a cross-section of borehole 104 with a pulsed-neutron logging tool 102 traveling through well casing 106. Borehole 104 may traverse through subterranean formation 108 (e.g., hydrocarbon reservoir) as a vertical well and/or a horizontal well. Pulsed-neutron logging tool 102 contains a neutron source 110, a first neutron detector 112, a second neutron detector 114, and a gamma ray detector 116. Pulsed-neutron logging tool 102 is suspended by a conveyance 118, which communicates power from a logging facility 120 to pulsed-neutron logging tool 102 and communicates telemetry from pulsed-neutron logging tool 102 to computer 122. In examples, pulsed-neutron logging tool 102 may be operatively coupled to a conveyance 118 (e.g., wireline, slickline, coiled tubing, pipe, downhole tractor, and/or the like) which may provide mechanical suspension, as well as electrical connectivity, for pulsed-neutron logging tool 102. Conveyance 118 and pulsed-neutron logging tool 102 may extend within casing string 142 to a desired depth within borehole 104. Conveyance 118, which may include one or more electrical conductors, may exit wellhead 126, may pass around pulley 128, may engage odometer 130, and may be reeled onto winch 132, which may be employed to raise and lower the tool assembly in borehole 104. The position of pulsed-neutron logging tool 102 may be monitored in a number of ways, including an inertial tracker in pulsed-neutron logging tool 102 and a paid-out conveyance length monitor in logging facility 120 (e.g., an idler wheel on the wireline cable). Multiple measurements may be desirable to enable the system to compensate for varying cable tension and cable stretch due to other factors. Computer 122 in logging facility 120 collects telemetry and position measurements and provides position-dependent logs of measurements from pulsed-neutron logging tool 102 and values that may be derived therefrom.

Pulsed-neutron logging tool 102 generally includes multiple instruments for measuring a variety of downhole parameters. Wheels, bow springs, fins, pads, or other centralizing mechanisms may be employed to keep pulsed-neutron logging tool 102 near the borehole axis during measurement operations. During measurement operations, generally, measurements may be performed as pulsed-neutron logging tool 102 is drawn up hole at a constant rate. The parameters and instruments may vary depending on the needs of the measurement operation.

Pulsed-neutron logging tool 102 operates by generating pulses of high energy neutrons that radiate from neutron source 110 into the surrounding environment including borehole 104 and subterranean formation 108. The highly energetic neutrons entering the surrounding environment interact with atomic nuclei, inducing gamma radiation. The induced gamma rays may be recorded as a scattering rate (and hence the rate of energy loss) and are generally dominated by the concentration of hydrogen atoms. Induced gamma rays and neutrons may be recorded by first neutron detector 112, second neutron detector 114, and/or gamma ray detector 116. As the presence of hydrogen is primarily attributable to the presence of water or hydrocarbon fluids, the rate of energy loss and gamma spectrum may yield accurate knowledge of borehole holdup. Accurate knowledge of the borehole holdup determines the accuracy of oil saturation in the formation as well as determining the flow in horizontal production wells.

Measurements taken by pulsed-neutron logging tool 102 may be gathered and/or processed by computer 122. For example, signals recorded by pulsed-neutron logging tool 102 may be sent to computer 122 where they may be stored on memory and then processed. The processing may be performed real-time during data acquisition or after recovery of pulsed-neutron logging tool 102. Processing may alternatively occur downhole on a computer disposed on pulsed-neutron logging tool 102 or may occur both downhole and at surface. In some examples, signals recorded by pulsed-neutron logging tool 102 may be conducted to computer 122 by way of conveyance 118. Computer 122 may process the signals, and the information contained therein may be displayed for an operator to observe and stored for future processing and reference. Computer 122 may also contain an apparatus for supplying control signals and power to pulsed-neutron logging tool 102.

As noted above, systems and methods of the present disclosure may be implemented, at least in part, with computer 122. While shown at surface 134, computer 122 may also be located at another location that is remote from borehole 104. In examples, computer 122 may be disposed on pulsed-neutron logging tool 102, which may allow for processing to occur downhole. Additionally, one or more computers 122 may be utilized during measurement operations. In such examples, a first computer may be at surface 134 and a second computer may be disposed on pulsed-neutron logging tool 102 downhole. Computer 122 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, a computer 122 may be a processing unit 136, a network storage device, or any other suitable device and may vary in size, shape, performance, functionality, and price. Computer 122 may include random access memory (RAM), one or more processing resources such as a central processing unit (CPU) or hardware or software control logic, ROM, and/or other types of nonvolatile memory. Additional components of the computer 122 may include one or more disk drives, one or more network ports for communication with external devices as well as an input device 138 (e.g., keyboard, mouse, etc.) and video display 140. Computer 122 may also include one or more buses operable to transmit communications between the various hardware components.

Alternatively, systems and methods of the present disclosure may be implemented, at least in part, with non-transitory computer-readable media. Non-transitory computer-readable media may include any instrumentality or aggregation of instrumentalities that may retain data and/or instructions for a period of time. Non-transitory computer-readable media may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

FIG. 1 further illustrates a typical casing string 142 that may extend from wellhead 126 at or above ground level to a selected depth within borehole 104. Casing string 142 may comprise a plurality of joints 144 or segments of casing string 142, each joint 144 being connected to the adjacent segments by a collar 146. There may be any number of layers in casing string 142. For example, a first casing 148 and a second casing 150. It should be noted that there may be any number of casing layers. FIG. 1 also illustrates a typical pipe string 152, which may be positioned inside of casing string 142 extending part of the distance down borehole 104. Pipe string 152 may be production tubing, tubing string, casing string, or other pipe disposed within casing string 142. Pipe string 152 may comprise concentric pipes. It should be noted that concentric pipes may be connected by collars 146. Pulsed-neutron logging tool 102 may be dimensioned so that it may be lowered into borehole 104 through pipe string 152, thus avoiding the difficulty and expense associated with pulling pipe string 152 out of borehole 104. In examples, cement (not illustrated) may be disposed on the outside of pipe string 152. Cement may further be disposed between pipe string 152 and casing string 142. It should be noted that cement may be disposed between any number of casings, for example between first casing 148 and second casing 150.

In logging systems, such as, for example, logging systems utilizing the pulsed-neutron logging tool 102, a digital telemetry system may be employed, wherein an electrical circuit may be used to both supply power to pulsed-neutron logging tool 102 and to transfer data between computer 122 and pulsed-neutron logging tool 102. A DC voltage may be provided to pulsed-neutron logging tool 102 by a power supply located above ground level, and data may be coupled to the DC power conductor by a baseband current pulse system. Alternatively, pulsed-neutron logging tool 102 may be powered by batteries located within the downhole tool assembly, and/or the data provided by pulsed-neutron logging tool 102 may be stored within the downhole tool assembly, rather than transmitted to the surface during logging.

With continued reference to FIG. 1, wellhead 126 is described. Wellhead 126 allows for entry into borehole 104, such as the placement of pulsed-neutron logging tool 102 into pipe string 152. In examples, wellhead 126 may include a lubricator head 154 and a lubricator head flange 156 which may be coupled to and sealed with lubricator body flange 158. Lubricator head 154 comprises sealing cartridge 160. Sealing cartridge 160 may be removable from lubricator head 154. Sealing cartridge 160 may be a container comprising a plurality of sealing elements 162 and lubricator cavities 164. Sealing elements 162 may comprise, but are not limited to, elastomeric materials, thermoplastic materials, thermosetting materials, composites thereof, or combinations thereof. Sealing elements 162 comprise an inner diameter to allow for pulsed-neutron logging tool 102, conveyance 118, wireline, coiled tubing, and/or the like to be disposed into borehole 104. Sealing elements 162 form a seal around conveyance 118 (or tubing if provided). Sealing elements 162 are selected such that the length of the diameter of the inner diameter is able to sufficiently seal around conveyance 118. In some example methods, a sealing cartridge 160 comprising a plurality of sealing elements 162 of one size may be removed if desired and exchanged for a different sealing cartridge comprising a plurality of sealing elements 162 of a different size if desired. For example, if a wireline operation requires sealing elements 162 of a first size, upon completion of said wireline operation, the sealing cartridge 160 comprising the sealing elements 162 of a first size may be removed from lubricator head 154 and replaced with a second sealing cartridge comprising sealing elements 162 of a second size to perform a subsequent operation, for example a tripping operation.

Pulsed-neutron elemental spectroscopy is a state-of-the-art and scientifically rigorous technique employed for mineralogy and lithology analysis in formation evaluations. The acquisition of elemental concentrations in pulsed-neutron logging with elemental spectroscopy relies on sophisticated spectral fitting methods that take advantage of the distinct gamma signatures associated with each element. During the logging process, the gamma rays emitted from the rock formations contain valuable information about the elemental composition of the minerals present. Spectral fitting methods, such as a weighted-least-square fitting, are employed to analyze these gamma spectra and unravel the contributions of different elements. By accurately fitting the gamma spectra with elemental signatures using this approach, precise and quantitative measurements of elemental concentrations can be obtained, enabling robust mineralogy and lithology analysis in reservoir characterization.

Figure 2:
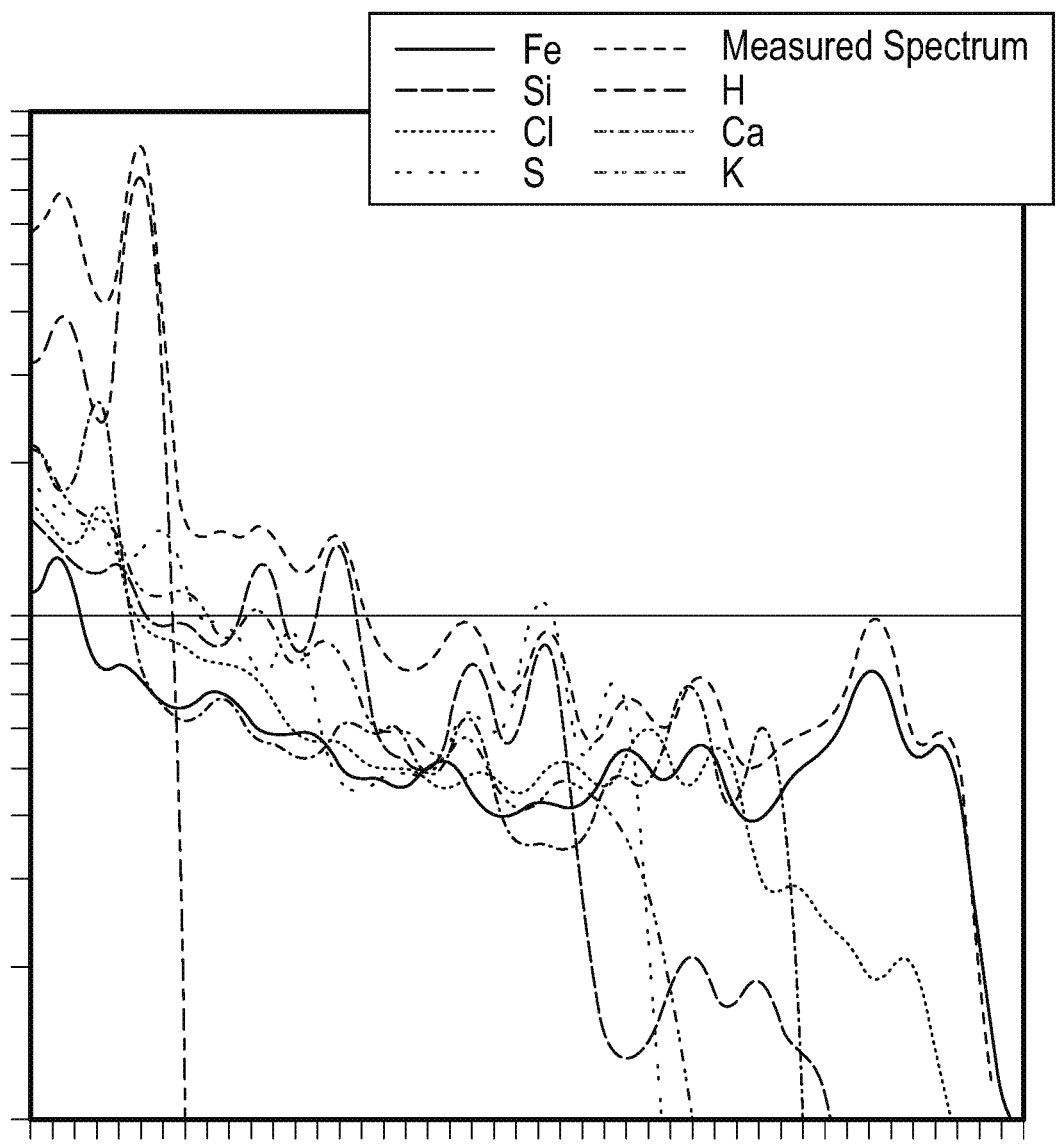
FIG. 2 illustrates an example of a measured spectrum using a pulsed-neutron logging tool with each spectrum of the pure elemental standard for iron (Fe), silicon (Si), chlorine (Cl), sulfur(S), hydrogen (H), calcium (Ca) and potassium (K), respectively.

In the weighted-least-square fitting algorithm, reference spectra of pure elements are employed as constituents for fitting. The algorithm determines the relative elemental yields by iteratively adjusting the coefficients of the reference spectra to minimize the difference between the measured gamma spectra and the fitted spectra. These relative elemental yields are then converted to absolute elemental yields using calibration factors obtained from standards. FIG. 2 illustrates an example of a measured spectrum using a pulsed-neutron logging tool with each spectrum of the pure elemental standard for iron (Fe), silicon (Si), chlorine (Cl), sulfur (S), hydrogen (H), calcium (Ca) and potassium (K). In gamma spectroscopy for downhole applications, one measures only the total spectra that is the convoluted sum of those individual elements. Traditionally, weighted-least-square fitting method is used to deconvolute measured spectra into relative yields of those individual pure elements, where weight function determines the relative yields of each pure element that constitutes the final spectra.

Although pure elements are the fundamental constituents of formation matrix, it is a somewhat unnatural representation of chemical composition and complex mixture of the formation matrix. Oxide standards (e.g., reference spectra for oxide compounds), on the other hand, such as those derived from common rock-forming minerals, can offer a more natural and realistic representation of the complex mineralogical and lithological heterogeneity that exists in real-world rock formations. These oxide standards can account for the variations in rock matrix effects, density, and chemical composition, leading to more accurate quantification of elemental concentrations.

Furthermore, oxide standards can provide a more comprehensive and diverse set of reference spectra, as they encompass a wider range of chemical compositions. This allows more natural selection of chemical oxide compounds when building standard spectrum for fitting. By using oxide standards in the weighted-least-square fitting algorithm, which are more closely related to the natural composition of rock formations, it is possible to improve the accuracy and reliability of elemental quantification in pulsed-neutron logging and enhance the robustness of mineralogy and lithology analysis.

The weighted-least-square fitting algorithm uses reference spectra from elemental oxide standards to fit against the measured gamma spectra obtained from logging measurements. The elements of interest for nuclear well logging mineralogy and lithology analysis depend on the specific objectives of the logging measurements and the formations being evaluated. Some commonly targeted elements include silicon (Si), calcium (Ca), iron (Fe), potassium (K), magnesium (Mg), sodium (Na), phosphorus (P), and sulfur(S). Silicon is a key element in many minerals, such as quartz, feldspars, and clays, and its quantification can provide insights into the mineralogy and lithology of the formations. Calcium is often used as an indicator of carbonate minerals, such as calcite and dolomite, which are important components of many sedimentary rocks, including limestone and dolostone. Iron is present in various minerals, including iron oxides, sulfides, and silicates, and its determination can help in identifying and characterizing iron-rich minerals, which can provide information about the rock composition and alteration. Potassium is commonly found in minerals such as feldspars, micas, and clays, and its quantification can provide insights into the mineralogy and alteration of the formations. Depending upon the specific logging tool and objectives, other elements such as magnesium (Mg), sodium (Na), phosphorus (P), and sulfur(S) may also be of interest in mineralogy and lithology analysis, as they are present in various minerals and can provide additional information about the rock composition and properties.

Oxide forms some of the most common elements of interest for nuclear well logging mineralogy and lithology analysis including silicon (Si): silicon dioxide ($SiO_2$); calcium (Ca): calcium oxide (CaO); iron (Fe): iron oxide (FeO or $Fe_2O_3$); potassium (K): potassium oxide ($K_2O$); magnesium (Mg): magnesium oxide (MgO); sodium (Na): sodium oxide ($Na_2O$); phosphorus (P): phosphorus pentoxide ($P_2O_5$); and sulfur(S): sulfur dioxide ($SO_2$).

Additionally, pure formation compounds (e.g., reference spectra for rock forming mineral compounds) can be used as standard for spectral fitting. Common formation chemical compounds include: Quartz: $SiO_2$; Calcite: $CaCO_3$; Dolomite: $CaMg(CO_3)_2$; Anhydrite: $CaSO_4$; Clay: $Al_2Si_2O_5(OH)_4$; Water: $H_2O$; and Oil: $C_4H_4$.

Replacing pure elemental standards with oxide standards or rock-forming minerals in weighted-least-square fitting can offer several advantages in mineralogy and lithology analysis. Fitting provides relative yields of each oxide mineral or chemical compound. These oxide standards can provide a more natural representation of the complex composition of rock formations, densities of the rock formations, and chemical compositions of the rock formations. By directly fitting the oxide standard spectra (or mineral spectra) to the measured gamma spectra using the weighted-least-square fitting, it is possible to obtain more accurate and reliable quantification of mineralogy and lithology. The oxide standards to fit may be based on the reservoir type and regional interest, for example. These minerals and compounds are then used to build an oxide-closure model to determine formation type, mineralogy, and lithology. After volumetrics of each mineral and lithology, one can compute formation density based upon the density of limestone, dolomite, sandstone, and anhydrite. Therefore, the mineralogy and lithology determined according to the present disclosure improves reservoir characterization for enhanced production strategies and operations.

Accordingly, the techniques as described herein enhance the accuracy and precision of mineralogy analysis in elemental spectroscopy logging by utilizing oxide standards as reference materials that provide more representative and realistic signatures of geological formations. The systems and methods may include any of the various features disclosed herein, including one or more of the following statements.

Statement 1. A method comprising: logging a wellbore with a tool; and fitting reference spectra from oxide compounds and/or rock-forming mineral compounds against measured gamma spectra obtained with the tool, to characterize a subterranean formation that the wellbore extends through.

Statement 2. The method of statement 1, wherein the fitting includes a weighted-least-square fitting.

Statement 3. The method of statement 1 or statement 2, wherein the tool includes a pulsed neutron logging tool.

Statement 4. The method of any one of statements 1-3, wherein the reference spectra is fitted with a computer that receives measurements from the tool.

Statement 5. The method of any one of statements 1-4, further comprising characterizing the subterranean formation by determining a type of a rock formation based on the fitting of the reference spectra of the rock-forming mineral compounds.

Statement 6. The method of any one of statements 1-5, further comprising characterizing the subterranean formation by determining a type of a rock formation based on the fitting of the reference spectra of the oxide compounds.

Statement 7. The method of any one of statements 1-6, further comprising characterizing the subterranean formation by determining a density of a rock formation based on the fitting of the reference spectra of the rock-forming mineral compounds.

Statement 8. The method of any one of statements 1-7, further comprising characterizing the subterranean formation by determining a density of a rock formation based on the fitting of the reference spectra of the oxide compounds.

Statement 9. The method of any one of statements 1-8, further comprising characterizing the subterranean formation by determining a chemical composition of a rock formation based on the fitting of the reference spectra of the rock-forming mineral compounds.

Statement 10. The method of any one of statements 1-9, further comprising characterizing the subterranean formation by determining a chemical composition of a rock formation based on the fitting of the reference spectra of the oxide compounds.

Statement 11. A system comprising a logging tool; and a computer configured to: fit reference spectra from oxide compounds and/or rock-forming mineral compounds against measured gamma spectra obtained from the logging tool, to characterize a subterranean formation.

Statement 12. The system of statement 11, wherein the computer is configured to fit the reference spectra from oxide compounds via a weighted-least-square fitting.

Statement 13. The system of statement 11 or statement 12, wherein the computer is configured to fit the reference spectra from rock-forming mineral compounds via a weighted-least-square fitting.

Statement 14. The system of any one of statements 11-13, wherein the logging tool includes a pulsed neutron logging tool.

Statement 15. The system of any one of statements 11-14, wherein the computer is configured to characterize the subterranean formation by determining a type of a rock formation based on the fitting of the reference spectra of the rock-forming mineral compounds.

Statement 16. The system of any one of statements 11-15, wherein the computer is configured to characterize the subterranean formation by determining a type of a rock formation based on the fitting of the reference spectra of the oxide compounds.

Statement 17. The system of any one of statements 11-16, wherein the computer is configured to characterize the subterranean formation by determining a density of a rock formation based on the fitting of the reference spectra of the rock-forming mineral compounds.

Statement 18. The system of any one of statements 11-17, wherein the computer is configured to characterize the subterranean formation by determining a density of a rock formation based on the fitting of the reference spectra of the oxide compounds.

Statement 19. The system of any one of statements 11-18, wherein the computer is configured to characterize the subterranean formation by determining a chemical composition of a rock formation based on the fitting of the reference spectra of the rock-forming mineral compounds.

Statement 20. The system of any one of statements 11-19, wherein the computer is configured to characterize the subterranean formation by determining a chemical composition of a rock formation based on the fitting of the reference spectra of the oxide compounds.

Although the present disclosure and its advantages have been described in detail, it should be understood that various changes, substitutions, and alterations may be made herein without departing from the spirit and scope of the disclosure as defined by the appended claims. The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the elements that it introduces.

For the sake of brevity, only certain ranges are explicitly disclosed herein. However, ranges from any lower limit may be combined with any upper limit to recite a range not explicitly recited, as well as ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method comprising:
   logging a wellbore with a tool; and
   fitting reference spectra from oxide compounds and/or rock-forming mineral compounds against measured gamma spectra obtained with the tool, to characterize a subterranean formation that the wellbore extends through, wherein the fitting comprises a weighted-least square fitting using spectra from elemental oxide standards.

2. The method of claim 1, wherein the tool includes a pulsed neutron logging tool.

3. The method of claim 2, wherein the reference spectra is fitted with a computer that receives measurements from the tool.

4. The method of claim 1, further comprising characterizing the subterranean formation by determining a type of a rock formation based on the fitting of the reference spectra of the rock-forming mineral compounds.

5. The method of claim 1, further comprising characterizing the subterranean formation by determining a type of a rock formation based on the fitting of the reference spectra of the oxide compounds.

6. The method of claim 1, further comprising characterizing the subterranean formation by determining a density of a rock formation based on the fitting of the reference spectra of the rock-forming mineral compounds.

7. The method of claim 1, further comprising characterizing the subterranean formation by determining a density of a rock formation based on the fitting of the reference spectra of the oxide compounds.

8. The method of claim 1, further comprising characterizing the subterranean formation by determining a chemical composition of a rock formation based on the fitting of the reference spectra of the rock-forming mineral compounds.

9. The method of claim 1, further comprising characterizing the subterranean formation by determining a chemical composition of a rock formation based on the fitting of the reference spectra of the oxide compounds.

10. A system comprising:
    a logging tool; and
    a computer configured to: fit reference spectra from oxide compounds and/or rock-forming mineral compounds against measured gamma spectra obtained from the logging tool, to characterize a subterranean formation, wherein the computer is configured to fit the reference spectra from the oxide compounds via a weighted-least-square fitting using spectra from elemental oxide standards.

11. The system of claim 10, wherein the computer is configured to fit the reference spectra from rock-forming mineral compounds via a weighted-least-square fitting.

12. The system of claim 10, wherein the logging tool includes a pulsed neutron logging tool.

13. The system of claim 10, wherein the computer is configured to characterize the subterranean formation by determining a type of a rock formation based on the fitting of the reference spectra of the rock-forming mineral compounds.

14. The system of claim 10, wherein the computer is configured to characterize the subterranean formation by determining a type of a rock formation based on the fitting of the reference spectra of the oxide compounds.

15. The system of claim 10, wherein the computer is configured to characterize the subterranean formation by determining a density of a rock formation based on the fitting of the reference spectra of the rock-forming mineral compounds.

16. The system of claim 10, wherein the computer is configured to characterize the subterranean formation by determining a density of a rock formation based on the fitting of the reference spectra of the oxide compounds.

17. The system of claim 10, wherein the computer is configured to characterize the subterranean formation by determining a chemical composition of a rock formation based on the fitting of the reference spectra of the rock-forming mineral compounds.

18. The system of claim 10, wherein the computer is configured to characterize the subterranean formation by determining a chemical composition of a rock formation based on the fitting of the reference spectra of the oxide compounds.

\* \* \* \* \*